(12) United States Patent
Zeng et al.

(10) Patent No.: US 10,168,252 B1
(45) Date of Patent: Jan. 1, 2019

(54) METHODS AND APPARATUS TO FACILITATE TIRE FORCE ESTIMATION

(71) Applicant: Ford Global Technologies, LLC, Dearborn, MI (US)

(72) Inventors: Xiangrui Zeng, Northville, MI (US); Amit Mohanty, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/850,015

(22) Filed: Dec. 21, 2017

(51) Int. Cl.
| | |
|---|---|
| *B60Q 1/00* | (2006.01) |
| *G01M 17/02* | (2006.01) |
| *G07C 5/00* | (2006.01) |
| *G01L 5/16* | (2006.01) |
| *B60C 9/00* | (2006.01) |
| *G01L 5/20* | (2006.01) |
| *G01L 5/13* | (2006.01) |

(52) U.S. Cl.
CPC .............. *G01M 17/02* (2013.01); *B60C 9/00* (2013.01); *G01L 5/16* (2013.01); *G01L 5/20* (2013.01); *G07C 5/006* (2013.01); *G01L 5/13* (2013.01)

(58) Field of Classification Search
CPC .......................... B60G 17/0162; G01M 17/02
USPC ......................................................... 340/438
See application file for complete search history.

(56) References Cited

U.S. PATENT DOCUMENTS

| | | | |
|---|---|---|---|
| 7,228,732 B2 | 6/2007 | Turner et al. | |
| 9,752,962 B2 | 9/2017 | Singh | |
| 2005/0066719 A1* | 3/2005 | Turner | B60C 11/246 73/146 |
| 2015/0112550 A1* | 4/2015 | Cho | B60G 17/0162 701/38 |
| 2017/0102293 A1* | 4/2017 | Singh | G01M 17/02 |
| 2017/0113494 A1* | 4/2017 | Singh | B60C 11/246 |

FOREIGN PATENT DOCUMENTS

| | | |
|---|---|---|
| CN | 103278339 B | 4/2015 |
| JP | 2005205956 A | 8/2005 |

OTHER PUBLICATIONS

Jaballah Belgacem et al., *Estimation of Longitudinal Tire Forces for All-Terrain Vehicle*, Jan. 24, 2013, 3 pages.
Xudong Zhang et al., *A Hierarchical Estimator Development for Estimation of Tire—Road Friction Coefficient*, Feb. 8, 2017, 22 pages.

* cited by examiner

*Primary Examiner* — Fabricio R Murillo Garcia
(74) *Attorney, Agent, or Firm* — James P. Muraff; Neal, Gerber & Eisenberg LLP (57) ABSTRACT

Method and apparatus are disclosed to facilitate TPMS broadcast mode selection. An example vehicle comprises sensors, a processor, and memory. The sensor are to generate vehicle dynamics information (VDI). The processor is in communication with the memory and with the sensors. The processor is configured to: estimate relative pitch and roll angles using the VDI, estimate a tire normal force using the relative pitch and roll angles and the VDI, estimate a tire rolling resistance using the tire normal force, and estimate a tire longitudinal force and a tire lateral force based on the tire rolling resistance and the VDI.

20 Claims, 9 Drawing Sheets

METHODS AND APPARATUS TO FACILITATE TIRE FORCE ESTIMATION

TECHNICAL FIELD

The present disclosure generally relates to vehicle dynamics measurement and analysis and, more specifically, methods and apparatus to facilitate tire force estimation.

BACKGROUND

In recent years, vehicles have been equipped with on-board computing platforms (OBCPs) and sensors including inertial measurement units (IMUs) to measure how the vehicle moves in space, referred to as vehicle dynamics. IMUs and OBCPs are often located inside a body of the vehicle. IMUs measure vehicle acceleration in three axes: x (forward/back), y (side to side), and z (up/down). IMUs additionally measure how quickly the vehicle is turning about the three axes, referred to as: pitch rate (about y), yaw rate (about z), and roll rate (about x). OBCPs use the measurement data to estimate forces acting on the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises sensors, a processor, and memory. The sensor are to generate vehicle dynamics information (VDI). The processor is in communication with the memory and with the sensors. The processor is configured to: estimate relative pitch and roll angles using the VDI; estimate a tire normal force using the relative pitch and roll angles and the VDI; and estimate a tire rolling resistance using the tire normal force.

An example method is disclosed. The method comprises: estimating, with a processor, relative pitch and roll angles using VDI from sensors; estimating, with the processor, a tire normal force using the relative pitch and roll angles and the VDI; and estimating, with the processor, a tire rolling resistance using the tire normal force.

An example system is disclosed. The system comprises an inertial measurement unit (IMU) and a processor. The IMU is disposed in a vehicle. The processor is in communication with the IMU. The processor is configured to: receive VDI from the IMU; estimate a relative pitch angle and a relative roll angle based on the VDI; estimate front and rear effective masses based on the relative pitch angle; estimate a tire normal force based on the relative roll angle and the front and rear effective masses; estimate a tire rolling resistance based on the tire normal force and the VDI; and estimate a tire longitudinal force and a tire lateral force based on the tire rolling resistance and the VDI.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Forces on vehicle tires where the tire contacts a roadway are important to vehicle dynamics but are difficult to measure directly. Therefore, tire forces are often estimated based on vehicle motion (e.g., vehicle acceleration and rotation rates) measured by vehicle sensors. Real-time estimated tire force values can be used in various applications, including safety-related vehicle control design, tire wear monitoring, and indirect driving behavior analysis, etc.

Traditionally, there are two approaches to estimating tire forces based on vehicle motion: with a predetermined tire force-slip model and without a tire force-slip model. With a tire force-slip model, vehicle dynamics information is input into the tire force-slip model to yield tire force estimates. Fewer sensors are required using the tire force-slip model approach, but the resultant estimates are often inaccurate due to inaccuracies in the force-slip model brought by tire nonlinearity and other factors such as temperature and humidity. Without a tire force-slip model, only the vehicle dynamics information is used to estimate tire forces. However, when using some existing estimation methods without a tire force-slip model, achieving accurate results can be challenging in some operating conditions, particularly when the vehicle is running in a steady state and the tire forces are relatively small.

This disclosure provides methods and apparatus to estimate tire forces in all driving conditions, including driven wheel longitudinal forces during constant speed cruising, using vehicle dynamics information without a tire force-slip model in real time. By estimating tire forces in all driving conditions, driving habits and long-term tire wear may be monitored.

Figure 1:
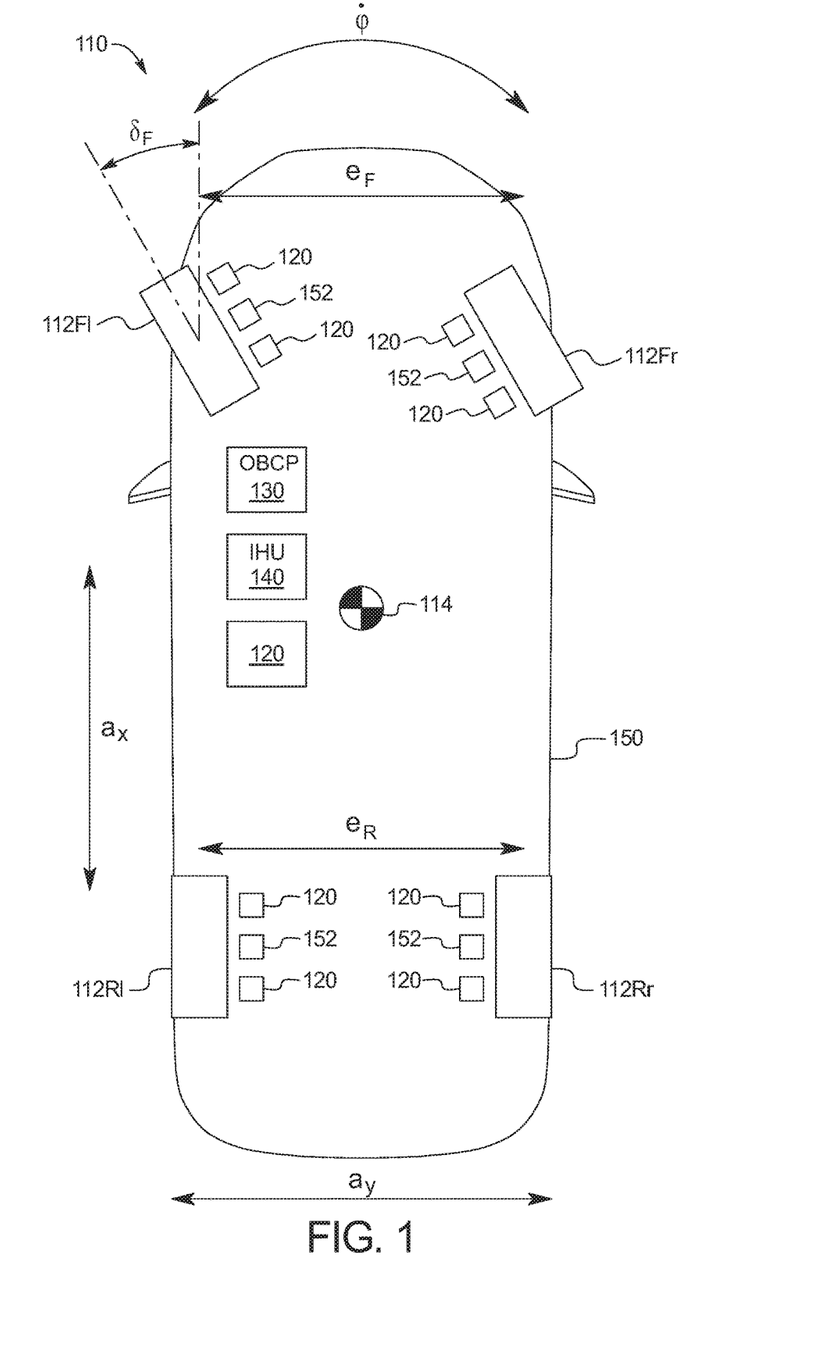
FIG. 1 is a schematic top view of a vehicle operating in accordance with the teachings of this disclosure.
Figure 2:
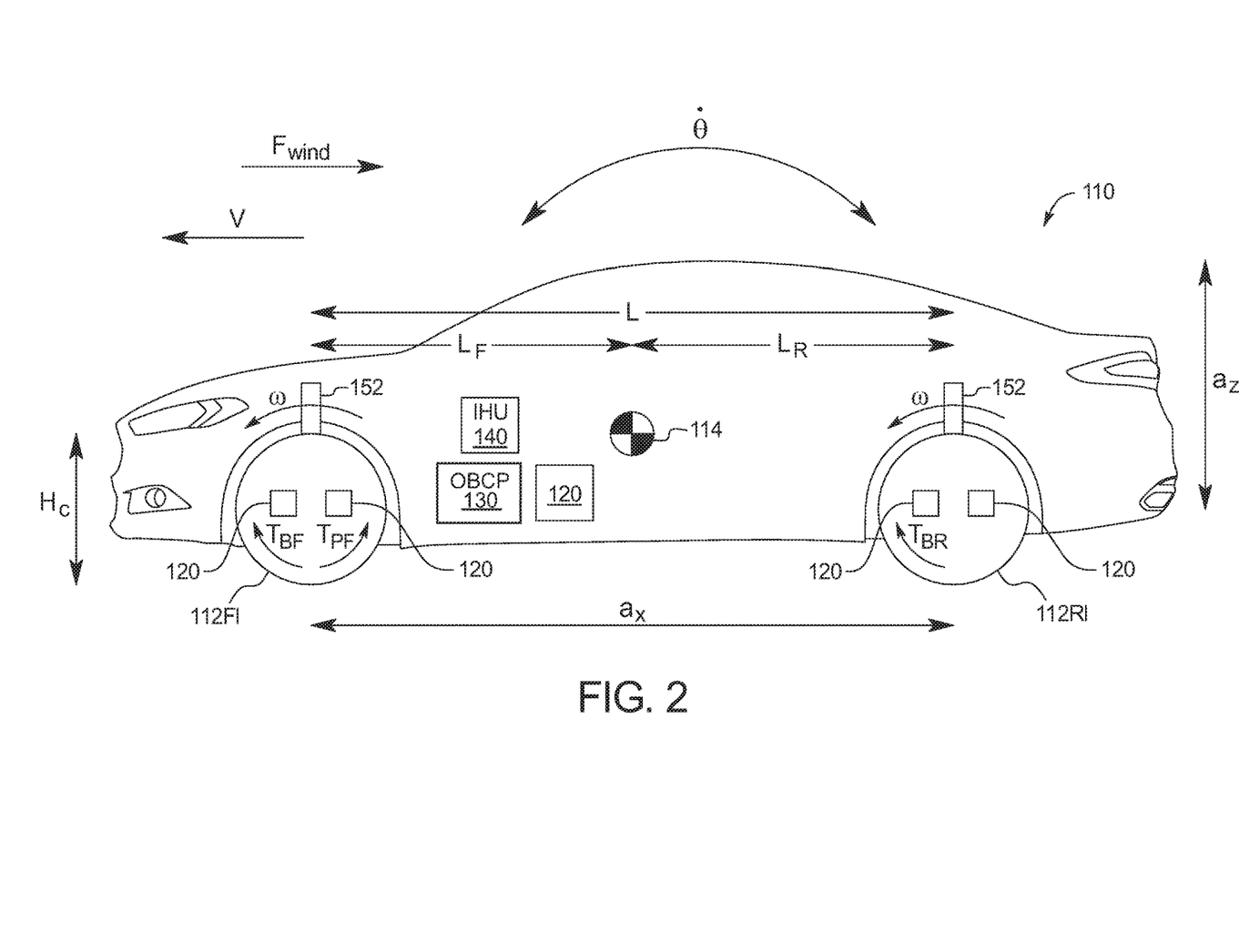
FIG. 2 is a schematic side view of the vehicle of FIG. 1.
Figure 3:
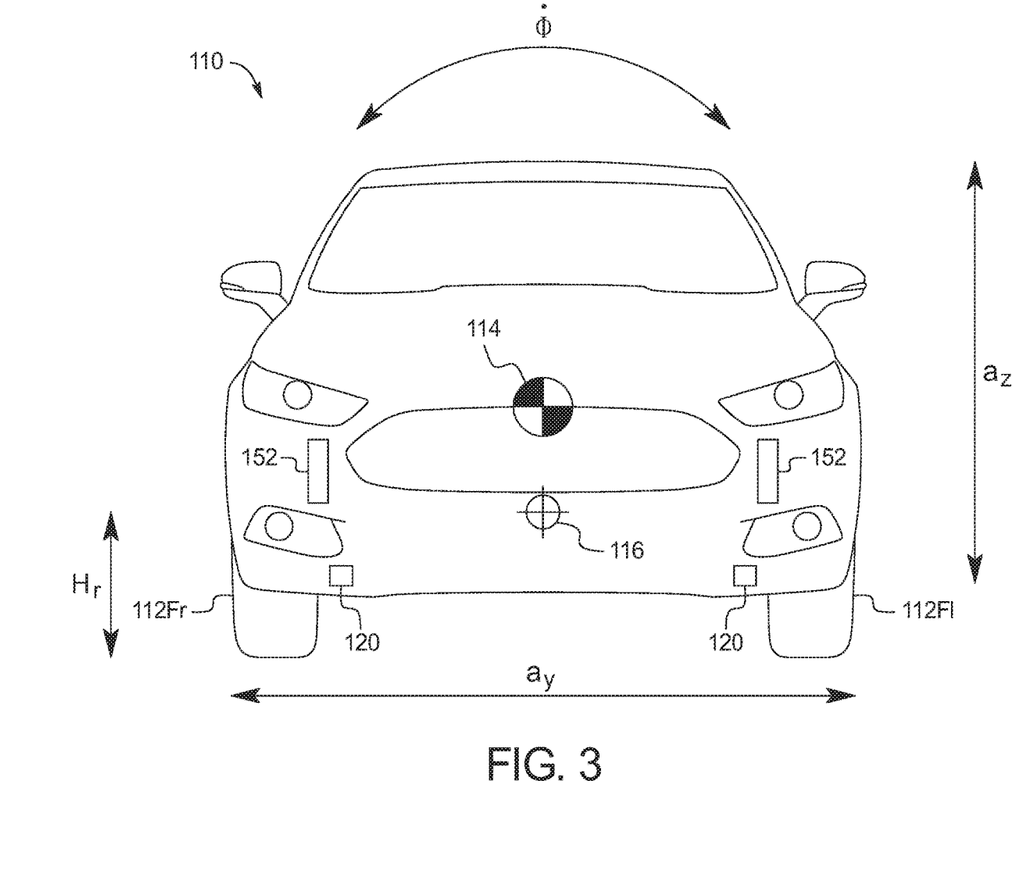
FIG. 3 is a schematic front view of the vehicle of FIG. 1.

FIG. 1 is a schematic top view of a vehicle 110 operating in accordance with the teachings of this disclosure. FIG. 2 is a schematic side view of the vehicle 110 of FIG. 1. FIG. 3 is a schematic front view of the vehicle 110 of FIG. 1. As shown in FIGS. 1, 2, and 3 the vehicle 110 includes wheel and tire assemblies 112, a center of gravity (CoG) 114, a roll center 116, sensors 120, an on-board computing platform (OBCP) 130, an infotainment head unit (IHU) 140, and a body 150. The body 150 includes suspension elements 152 such as linkages, struts, springs, dampers, bushings, etc.

The wheel and tire assemblies 112 include respective axles. The wheel and tire assemblies 112 are rotatably connected to the body 150 via the axles and the suspension elements 152. The wheel and tire assemblies include a front left wheel and tire assembly 112Fl, a front right wheel and tire assembly 112Fr, a rear left wheel and tire assembly 112Rl, and a rear right wheel and tire assembly 112Rr. In the illustrated example the wheel and tire assemblies 112 are substantially identical. In some examples, the front wheel and tire assemblies 112 differ from the rear wheel and tire assemblies 112 (not shown) (e.g., larger wheels and tires on a rear-wheel-drive sports vehicle). The wheel and tire assemblies 112, the CoG 114, and the roll center 116 define a plurality of distances between each other, referred to as a geometry of the vehicle 110. The geometry of the vehicle 110 includes:

$H_c$, a height of the CoG 114;
$H_r$, a height of the roll center 116;
$e_F$, a front track width between the front left and front right wheel and tire assemblies 112Fl, 112Fr;
$e_R$, a rear track width between the rear left and rear right wheel and tire assemblies 112Rl, 112Rr;
$L_R$, a longitudinal distance from the CoG 114 to the rear axles;
$L_F$, a longitudinal distance from center of gravity to front axle; and
$L$, a longitudinal distance between the front and rear axles.

The sensors 120 may be arranged in and around the vehicle 110 in any suitable fashion. The sensors 120 may be mounted to measure properties around the exterior of the vehicle 110. Additionally, some sensors 120 may be mounted inside the cabin of the vehicle 110 or in the body of the vehicle 110 (such as, the engine compartment, the wheel wells, etc.) to measure properties in the interior of the vehicle 110. For example, such sensors 120 may include accelerometers, odometers, tachometers, pitch rate and yaw rate sensors, wheel speed sensors, microphones, tire pressure sensors, and biometric sensors, etc. In the illustrated example, the sensors 120 are wheel speed sensors, powertrain monitoring sensors, and an inertial measurement unit (IMU). The sensors 120 generate signals that are processed by the OBCP 130 into wheel speeds $\omega$, propulsive torques $T_P$, and braking torques $T_B$ for each of the wheel and tire assemblies 112. It should be understood and appreciated that the propulsive and braking torques $T_P$, $T_B$ may be values derived by the OBCP 130 based on data from the sensors 120. More specifically, these wheel speeds, propulsive torques, and braking torques may be referred to as $\omega_{Fl}$, $T_{PFl}$, and $T_{BFl}$ for the front left wheel and tire assembly 112Fl; $\omega_{Fr}$, $T_{PFr}$, and $T_{BFr}$ for the front right wheel and tire assembly 112Fr; $\omega_{Rl}$, $T_{PRl}$, and $T_{BRl}$ for the rear left wheel and tire assembly 112Rl; and $\omega_{Rr}$, $T_{PRr}$, and $T_{BRr}$ for the rear right wheel and tire assembly 112Rr. The sensors 120 further sense vehicle speed $v$, pitch rate $\theta'$, yaw rate $\varphi'$, roll rate $\phi'$, front wheel steering angle $\delta_F$, longitudinal acceleration $a_x$, lateral acceleration $a_y$, and normal acceleration $a_z$. In other words, the sensors 120 generate vehicle dynamics information (VDI) of the vehicle 110.

The on-board computing platform 130 estimates forces on each of the wheel and tire assemblies 112 and wind resistance $F_{wind}$ using the vehicle dynamics information provided by the sensors 120, as will be explained in greater detail below. Further, the OBCP 130 generates messages related to the forces on the wheel and tire assemblies 112 for display via the IHU 140. For example, the OBCP 130 generates messages related to tire wear, driving behavior, tire dynamics, etc.

The infotainment head unit 140 provides an interface between the vehicle 140 and a user. The infotainment head unit 140 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 170 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 140 displays the infotainment system on, for example, the center console display.

Figure 4:
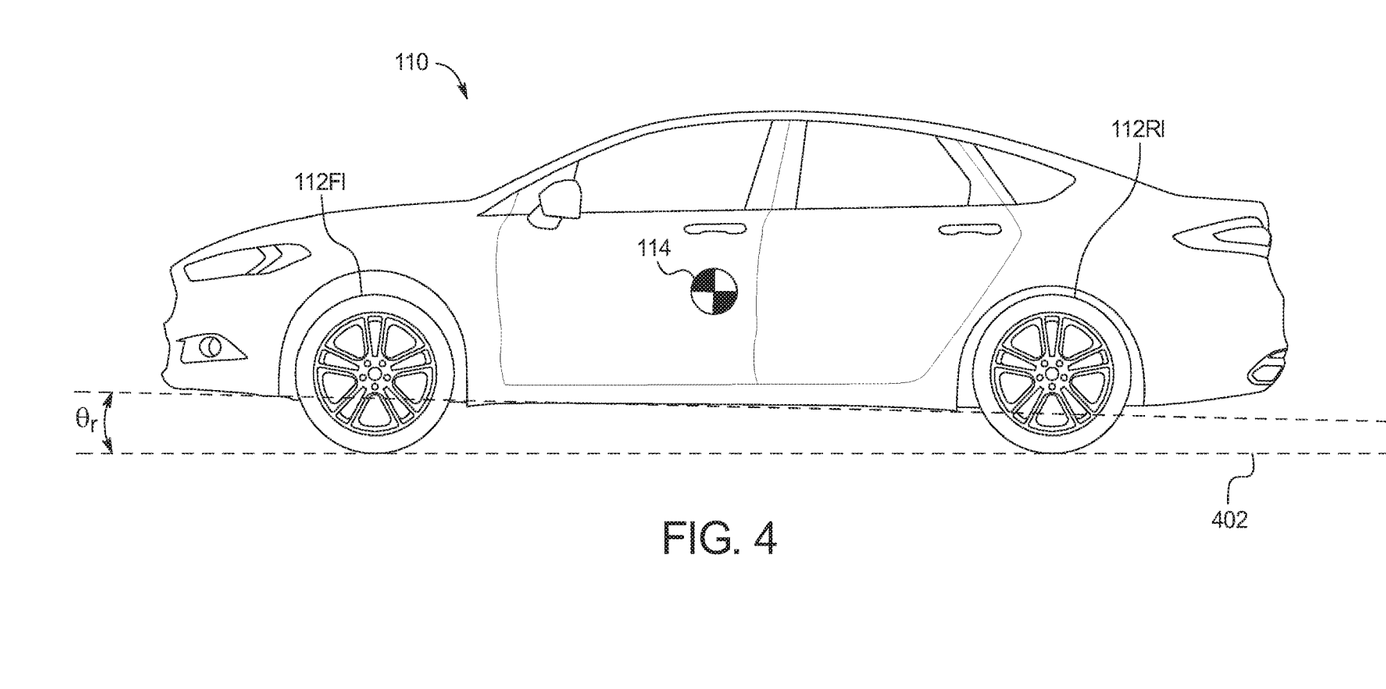
FIG. 4 is another schematic side view of the vehicle of FIG. 1.

FIG. 4 is another schematic side view of the vehicle 110 of FIG. 1. As shown in FIG. 4, a relative pitch angle $\theta_r$ is defined by a longitudinal line along the body of the vehicle 110 and a roadway 402. In operation, the OBCP 130 estimates the relative pitch angle $\theta_r$ based on vehicle dynamics information from the sensors 120, as will be described in greater detail below.

Figure 5:
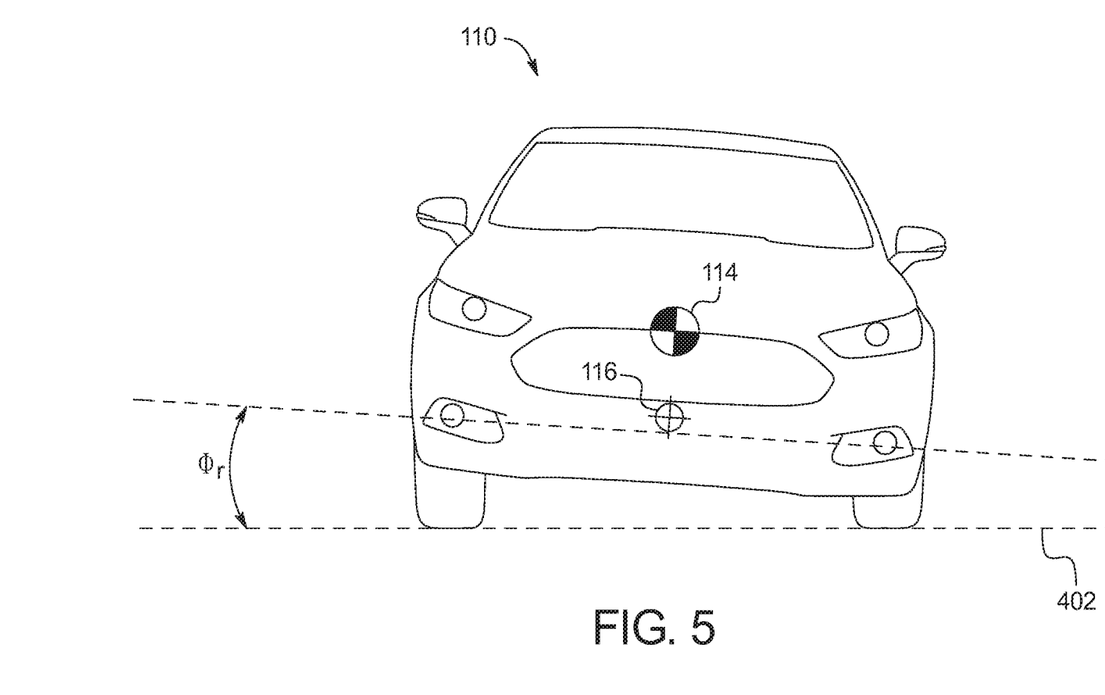
FIG. 5 is another schematic front view of the vehicle of FIG. 1.

FIG. 5 is another schematic front view of the vehicle 110 of FIG. 1. As shown in FIG. 5, a relative roll angle $\phi_r$ is defined by a lateral line through the body of the vehicle 110 and the roadway 402. In operation, the OBCP 130 estimates the relative roll angle $\phi_r$ based on vehicle dynamics information from the sensors 120, as will be described in greater detail below.

Figure 6:
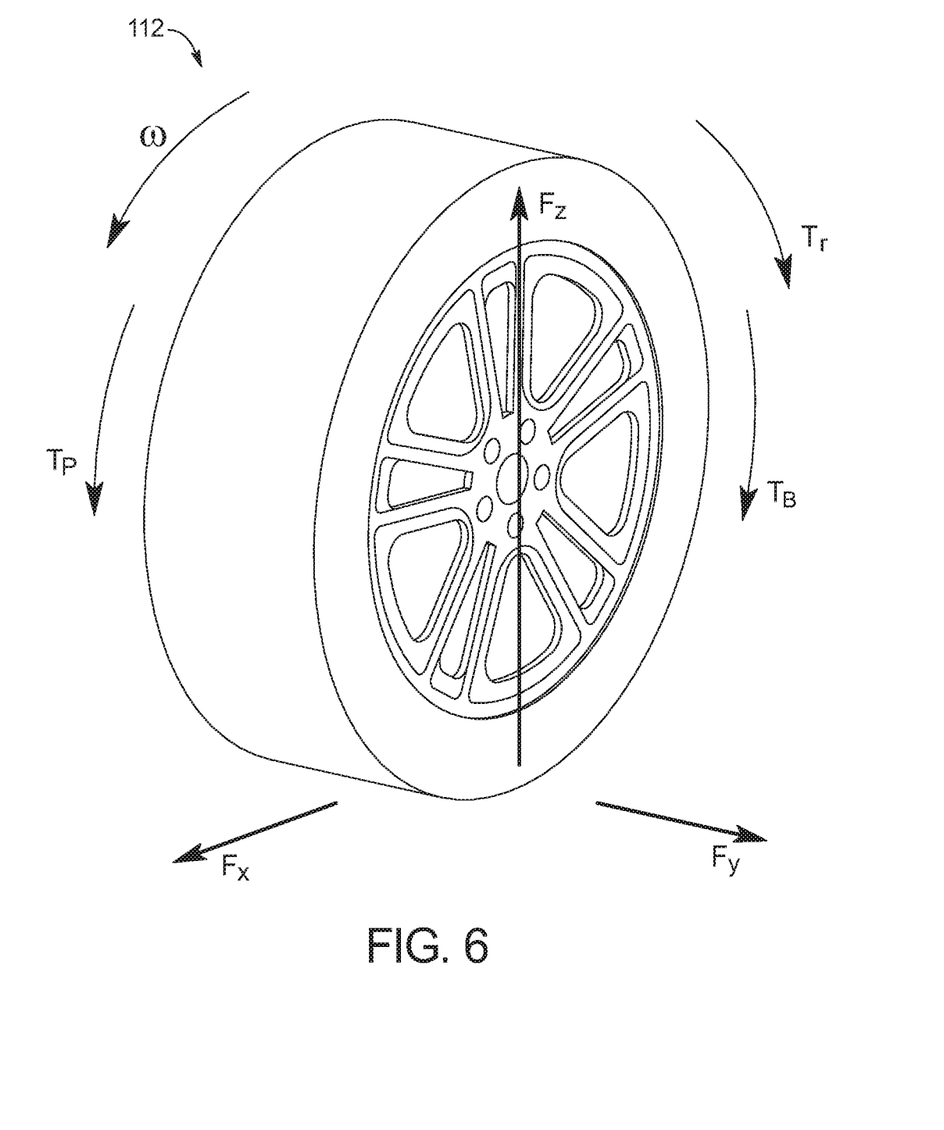
FIG. 6 is a perspective view of a wheel and tire assembly of the vehicle of FIG. 1.

FIG. 6 is a perspective view of one of the wheel and tire assemblies 112 of the vehicle 110 of FIG. 1. As shown in FIG. 6, a longitudinal tire force $F_x$, a lateral tire force $F_y$, and a normal tire force $F_z$, a tire rolling resistance $T_r$, the propulsive torque $T_P$, and the braking torque $T_B$ act on the wheel and tire assembly 112 as the wheel and tire assembly rotates at wheel speed $\omega$. It should be understood that $T_P$ is zero for undriven wheels (e.g., the rear wheels of a front-wheel-drive vehicle). It should also be understood that the tire rolling resistance $T_r$ is a reaction torque applied to the wheel and tire assembly 112 by the roadway 402. It should further be understood that each wheel and tire assembly 112 is acted on by longitudinal, lateral, and normal tire forces and tire rolling resistances. More specifically, these forces and reaction torque may be referred to as $F_{xFl}$, $F_{yFl}$, $F_{zFl}$, and $T_{rFl}$ for the front left wheel and tire assembly 112Fl; $F_{xFr}$, $F_{yFr}$, $F_{zFr}$, and $T_{rFr}$ for the front right wheel and tire assembly 112Fr; $F_{xRl}$, $F_{yRl}$, $F_{zRl}$, and $T_{rFl}$ for the rear left wheel and tire assembly 112Rl; and $F_{xRr}$, $F_{yRr}$, $F_{zRr}$, and $T_{rRr}$ for the rear right wheel and tire assembly 112Rr. In operation, the OBCP 130 estimates the longitudinal and normal tire forces $F_x$, $F_z$ and tire rolling resistances $T_r$ for each of the wheel and tire assemblies 112 based on vehicle dynamics information from the sensors 120, as will be described in greater detail below. Further, in operation, the OBCP 130 estimates a front lateral force $F_{yFa}$ for the front wheel and tire assemblies 112F1, 112Fr along the front axle and a rear lateral force $F_{yRa}$ for the rear wheel and tire assemblies 112Rl, 112Rr along the rear axle based on vehicle dynamics information from the sensors 120, as will be described in greater detail below.

Figure 7:
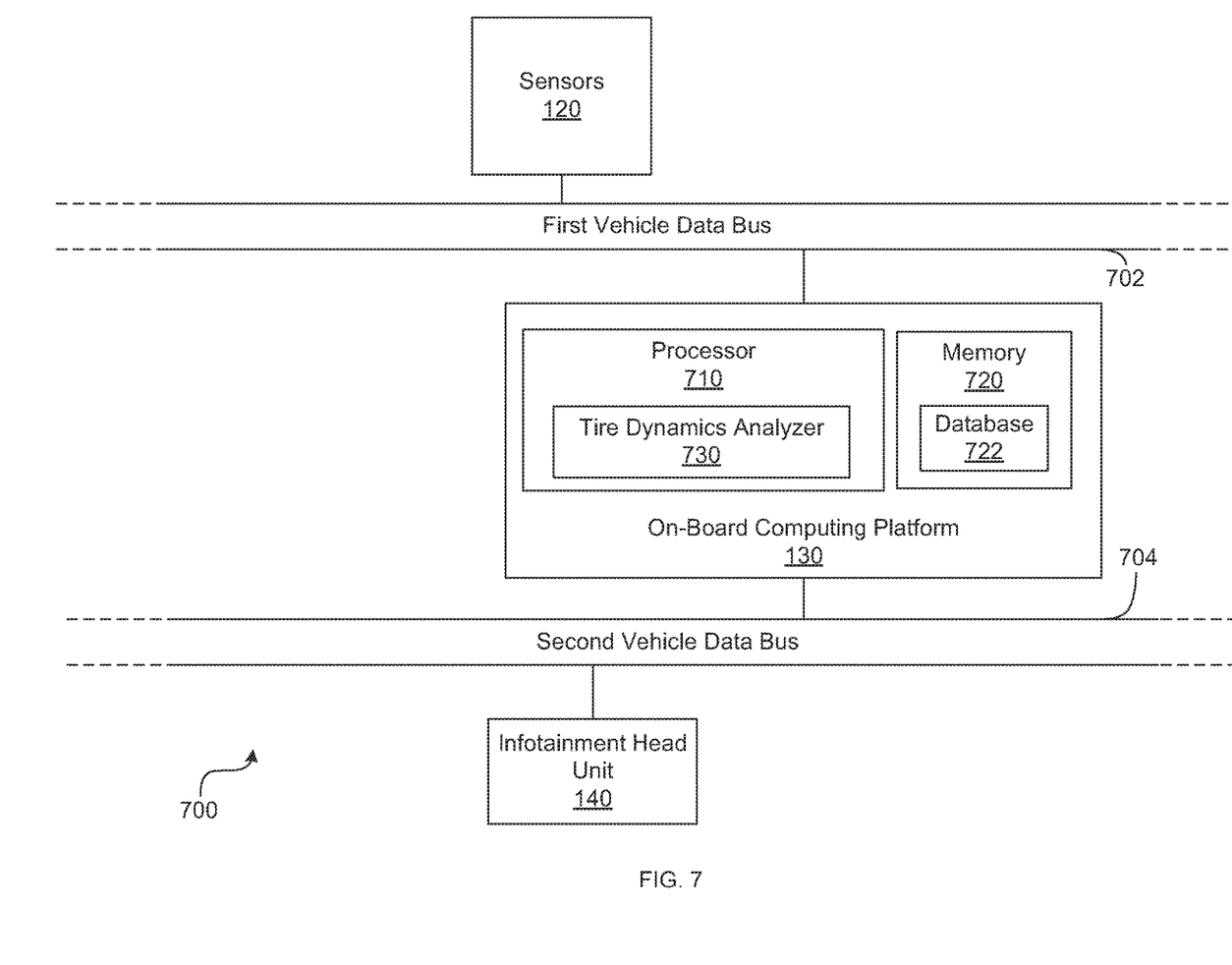
FIG. 7 is a block diagram of the electronic components of the vehicle of FIG. 1.

FIG. 7 is a block diagram of the electronic components 700 of the vehicle 110 of FIG. 1. The first vehicle data bus 702 communicatively couples the sensors 120, the OBCP 130, and other devices connected to the first vehicle data bus 702. In some examples, the first vehicle data bus 702 is implemented in accordance with the controller area network (CAN) bus protocol as defined by International Standards Organization (ISO) 11898-1. Alternatively, in some examples, the first vehicle data bus 702 may be a Media Oriented Systems Transport (MOST) bus, or a CAN flexible data (CAN-FD) bus (ISO 11898-7). The second vehicle data bus 704 communicatively couples the OBCP 130 and the infotainment head unit 140. The second vehicle data bus 704 may be a MOST bus, a CAN-FD bus, or an Ethernet bus. In some examples, the OBCP 130 communicatively isolates the first vehicle data bus 702 and the second vehicle data bus 704 (e.g., via firewalls, message brokers, etc.). Alternatively, in some examples, the first vehicle data bus 702 and the second vehicle data bus 704 are the same data bus.

The OBCP 130 includes a processor or controller 710 and memory 720. In the illustrated example, the OBCP 130 is structured to include a tire dynamics analyzer 730. Alternatively, in some examples, the tire dynamics analyzer 730 may be incorporated into another electronic control unit (ECU) with its own processor 710 and memory 720. The processor or controller 710 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 720 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 720 includes multiple kinds of memory, particularly volatile memory and non-volatile memory.

The memory 720 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 720, the computer readable medium, and/or within the processor 710 during execution of the instructions. The memory 720 stores a vehicle dynamics threshold database 722. The vehicle dynamics threshold database 722 includes predetermined tire force thresholds related to tire wear monitoring and/or vehicle dynamics monitoring.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 8:
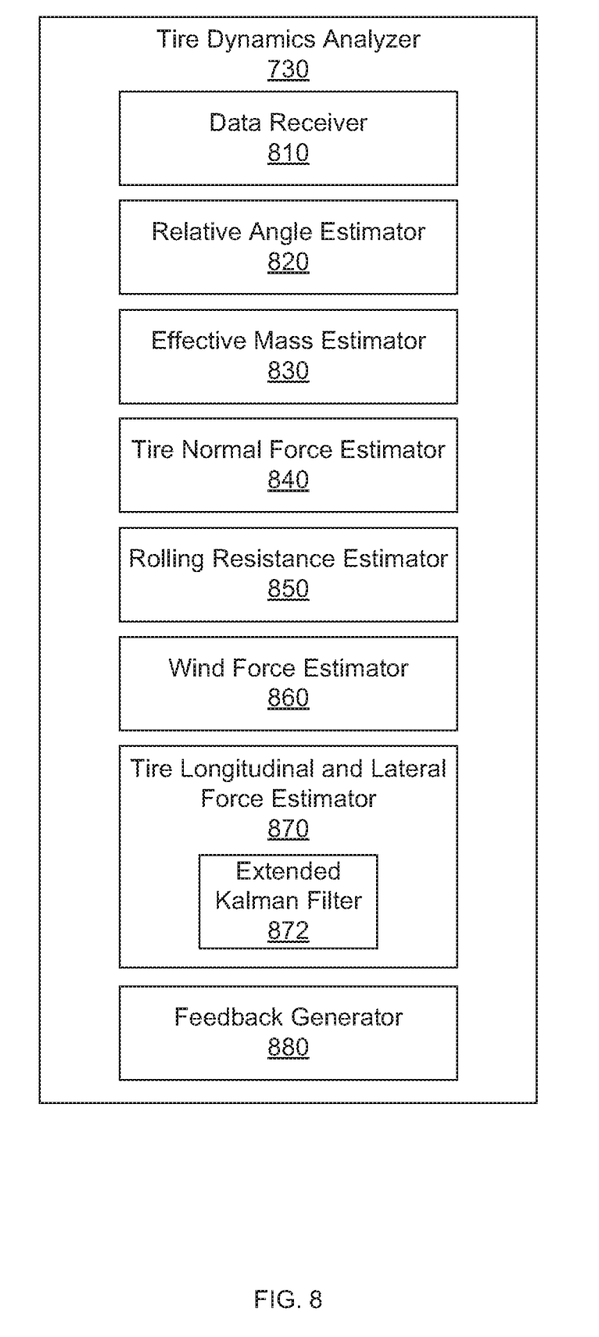
FIG. 8 is a more detailed block diagram of the Tire Dynamics Analyzer of FIG. 7.

FIG. 8 is a more detailed block diagram of the tire dynamics analyzer 730 of FIG. 7. The tire dynamics analyzer 730 includes a data receiver 810, a relative angle estimator 820, an effective mass estimator 830, a tire normal force estimator 840, a rolling resistance estimator 850, a wind force estimator 860, tire longitudinal and lateral force estimator 870, and a feedback generator 880. The tire longitudinal and lateral force estimator 870 includes an extended Kalman filter 872.

In operation, the data receiver 810 receives vehicle dynamics information sent by the sensors 120.

In operation, the relative angle estimator 820 estimates the relative pitch angle $\theta_r$ and the relative roll angle $\phi_r$. More specifically, the relative angle estimator 820 estimates the relative pitch angle $\theta_r$ based on the longitudinal acceleration a, the front and rear propulsive torques $T_{PF}$, $T_{PR}$, and first, second, and third predetermined constants $c_1$, $c_2$, $c_3$ using Equation 1, below. Further, the relative angle estimator estimates the relative roll angle $\phi_r$ based on the lateral acceleration $a_y$ and a fourth predetermined constant $c_4$ using Equation 2, below.

$$\theta_r \approx c_1 a_x + c_2 T_{PF} + c_3 T_{PR} \quad \text{Equation 1}$$

$$\phi_r \approx c_4 a_y \quad \text{Equation 2}$$

More specifically, the first, second, third, and fourth constants $c_1$, $c_2$, $c_3$, and $c_4$ are linear regression weights that are dependent on the geometry of the vehicle 110 and physical parameters (spring constants, damping rates, joint frictions, etc.) of the suspension elements 152. The first constant $c_1$ is a longitudinal acceleration regression coefficient. The second constant $c_2$ is a front propulsive torque regression coefficient. The third constant $c_3$ is a rear propulsive torque regression coefficient. The fourth constant $c_4$ is a lateral acceleration regression coefficient. Constants $c_1$, $c_2$, $c_3$, and $c_4$ are stored in the memory 720. Constants $c_1$, $c_2$, $c_3$, and $c_4$ are determined experimentally for individual vehicle lines during vehicle line testing and/or in real time via measurements from the sensors 120.

In operation, the effective mass estimator 830 estimates the effective masses shared by the front and rear axles $m_F$, $m_R$. More specifically, the effective mass estimator 830 estimates the vertical force shared by the front axles of the vehicle 110 $F_{zF}$ based on the total mass of the vehicle 110 $m$, the height of the CoG 114 $H_c$, the relative pitch angle $\theta_r$, the longitudinal distance from the CoG 114 to the rear axles $L_R$, and the longitudinal distance between the front and rear axles L using Equation 3, below. Further, the effective mass estimator 830 estimates the vertical force shared by the rear axles of the vehicle 110 $F_{zR}$ based on the total mass of the vehicle 110 $m$, the height of the CoG 114 $H_c$, the relative pitch angle $\theta_r$, the longitudinal distance from the CoG 114 to the front axles $L_F$, and the longitudinal distance between the front and rear axles L using Equation 4, below.

$$F_{zF} = -m\frac{H_C}{L}(a_x\cos\theta_r + a_z\sin\theta_r) - m\frac{L_R}{L}(a_x\sin\theta_r - a_z\cos\theta_r) \quad \text{Equation 3}$$

-continued $$F_{zR} = m\frac{H_C}{L}(a_x\cos\theta_r + a_z\sin\theta_r) - m\frac{L_F}{L}(a_x\sin\theta_r - a_z\cos\theta_r) \quad \text{Equation 4}$$

Further in operation, the effective mass estimator 830 estimates the effective mass shared by the front axles of the vehicle 110 $m_F$ based on the vertical force shared by the front axles of the vehicle 110 $F_{zF}$ and standard acceleration due to gravity g (approximately 9.8 m/s²) using Equation 5, below. Additionally, the effective mass estimator 830 estimates the effective mass shared by the rear axles of the vehicle 110 $m_R$ based on the vertical force shared by the rear axles of the vehicle 110 $F_{zR}$ and standard acceleration due to gravity g using Equation 6, below.

$$m_F = \frac{F_{zF}}{g} \quad \text{Equation 5}$$

$$m_R = \frac{F_{zR}}{g} \quad \text{Equation 6}$$

In operation, the tire normal force estimator 840 estimates the normal forces on each of the wheel and tire assemblies 112 based on the relative roll angle $\phi_r$, the lateral acceleration $a_y$, the normal acceleration $a_z$, the front and rear effective masses $m_F$, $m_R$, the height of the CoG 114 $H_c$, the height of the roll center 116 $H_r$, the front track width $e_F$, and the rear track width $e_R$ using Equations 7, 8, 9, and 10, below:

$$F_{zFl} = m_F\frac{H_C}{e_F}(a_y\cos\phi_r + a_z\sin\phi_r) - \quad \text{Equation 7}$$
$$\frac{m_F}{e_R}(a_y\sin\phi_r + a_z\cos\phi_r)\left(\frac{e_F}{2} + H_r\sin\phi_r\right)$$

$$F_{zFr} = -m_F\frac{H_C}{e_F}(a_y\cos\phi_r + a_z\sin\phi_r) - \quad \text{Equation 8}$$
$$\frac{m_F}{e_R}(a_y\sin\phi_r + a_z\cos\phi_r)\left(\frac{e_F}{2} - H_r\sin\phi_r\right)$$

$$F_{zRl} = m_R\frac{H_C}{e_R}(a_y\cos\phi_r - a_z\sin\phi_r) - \quad \text{Equation 9}$$
$$\frac{m_R}{e_R}(a_y\sin\phi_r + a_z\cos\phi_r)\left(\frac{e_R}{2} + H_r\sin\phi_r\right)$$

$$F_{zRr} = -m_R\frac{H_C}{e_R}(a_y\cos\phi_r - a_z\sin\phi_r) - \quad \text{Equation 10}$$
$$\frac{m_R}{e_R}(a_y\sin\phi_r + a_z\cos\phi_r)\left(\frac{e_R}{2} - H_r\sin\phi_r\right)$$

In operation, the rolling resistance estimator 850 estimates the rolling resistance $T_r$ for each of the wheel and tire assemblies 112 based on the respective normal force of each wheel and tire assembly 112 $F_z$, the respective wheel speed $\omega$ of each wheel and tire assembly 112, and fifth and sixth constants $c_5$, $c_6$ using Equation 11, below.

$$T_r \approx F_z(c_5 + c_6\omega) \quad \text{Equation 11}$$

More specifically, the fifth and sixth constants $c_5$, $c_6$ are linear regression weights that are dependent on tire geometry and material composition. The fifth constant $c_5$ is a tire normal force regression coefficient. The sixth constant $c_6$ is a tire normal-force-speed regression coefficient. Constants $c_5$ and $c_6$ are stored in the memory 720. Constants $c_5$ and $c_6$ are determined experimentally for individual vehicle lines during vehicle line testing and/or in real time via measurements from the sensors 120.

In operation, the wind force estimator 860 estimates the wind resistance force Fwind based on the vehicle speed v and a seventh constant $c_7$ using Equation 12, below.

$$F_{wind} = c_7 v^2 \quad \text{Equation 12}$$

More specifically, the seventh constant $c_7$ is a linear regression weight that is dependent geometry of the vehicle 110. The seventh constant $c_7$ is a wind resistance regression coefficient. Constants $c_7$ is stored in the memory 720. Constants $c_7$ is determined experimentally for individual vehicle lines during vehicle line testing and/or in real time via measurements from the sensors 120.

In operation, the tire longitudinal and lateral tire force estimator 870 estimates the longitudinal tire forces $F_x$ for each of the wheel and tire assemblies 112 and the lateral tire forces $F_{ya}$ for the front and rear pairs of the wheel and tire assemblies 112 using an Extended Kalman filter 872 based on the dynamic system model described by matrix Equations 13 and 14, below.

$$x_k = f(x_{k-1}, u_{k-1}) + w_{k-1} \quad \text{Equation 13}$$

$$y_k = h(x_k) + v_{k-1} \quad \text{Equation 14}$$

As shown in Equation 13, $f$ is a function whose inputs are two vectors $x_{k-1}$ and $u_{k-1}$, $w_{k-1}$ is an unmodelled error, sometimes referred to as a disturbance, and $x_k$ is a resultant vector. This disturbance $w_{k-1}$ may be due to, for example, changes in loading of the vehicle 110, errors in the determined wind force (e.g., a luggage carrier strapped to the vehicle), etc. Further, as shown in Equation 14, h is a function whose input is vector x, $v_{k-1}$ is electronic noise of the electronic components 700, and y is a resultant vector.

More specifically, the tire longitudinal and lateral force estimator 870 includes an Extended Kalman filter 872. To estimate the longitudinal and lateral tire forces $F_x$, $F_{ya}$, the tire longitudinal and lateral tire force estimator 870 assumes that $w_{k-1}$ and $v_{k-1}$ are random variables normally distributed with zero mean values and executes the Extended Kalman Filter 872 based on the propulsive torques $T_{PFl}$, $T_{PFr}$; the braking torques $T_{BFl}$, $T_{BFr}$, $T_{BRl}$, $T_{BRr}$; the wind resistance force $F_{wind}$, the rolling resistances $T_{rFl}$, $T_{rFr}$, $T_{TRl}$, $T_{rRr}$; the steering angle $\delta_F$, the yaw rate $\varphi$; the wheel speeds $\omega_{Fl}$, $\omega_{Fr}$, $\omega_{Rl}$, $\omega_{Rr}$, the longitudinal acceleration $a_x$, the lateral acceleration $a_y$, a sampling rate $\Delta t$ of the sensors 120, a radius r of the wheel and tire assemblies 112, and a moment of inertia $I_\omega$ of the wheel and tire assemblies 112 using matrix Equations 15 through 57 below.

$$\hat{x}_k^- = f(\hat{x}_{k-1}, u_{k-1}), \text{ where} \quad \text{Equation 15}$$

$$x_{k-1} = \quad \text{Equation 16}$$
$$[\omega_{Fl}, \omega_{Fr}, \omega_{Rl}, \omega_{Rr}, \varphi, F_{xFl}, \dot{F}_{xFl}, F_{xFr}, \dot{F}_{xFr}, F_{xRl}, \dot{F}_{xRl},$$
$$F_{xRr}, \dot{F}_{xRr}, F_{yFa}, \dot{F}_{yFa}, F_{yRa}, \dot{F}_{yRa}]^T$$
at step $k$-1

$$u_{k-1} = [T_{PFl} - T_{BFl} - T_{rFl}, T_{PFr} - T_{BFr} - T_{rFr}, \quad \text{Equation 17}$$
$$T_{PRl} - T_{BRl} - T_{rRl}, T_{PRr} - T_{BRr} - T_{rRr}, \delta_F]^T$$
at step $k$-1

$$f(x_{k-1}, u_{k-1}) = \quad \text{Equation 18}$$
$$[f_1(x_{k-1}, u_{k-1}), f_2(x_{k-1}, u_{k-1}), \ldots, f_{17}(x_{k-1}, u_{k-1})]^T, \text{ where}$$

$$f_1(x_{k-1}, u_{k-1}) = x_{k,1} = \quad \text{Equation 19}$$
$$\omega_{Fl,k} = \left[\left(T_{PFl,k-1} - T_{BFl,k-1} - T_{rFl,k-1} + F_{xFl,k-1}r\right)\frac{1}{I_\omega}\right]\Delta t + \omega_{Fl,k-1}$$

$$f_2(x_{k-1}, u_{k-1}) = x_{k,2} = \quad \text{Equation 20}$$
$$\omega_{Fr,k} = \left[\left(T_{PFr,k-1} - T_{BFr,k-1} - T_{rFr,k-1} + F_{xFr,k-1}r\right)\frac{1}{I_\omega}\right]\Delta t + \omega_{Fr,k-1}$$

$$f_3(x_{k-1}, u_{k-1}) = x_{k,3} = \quad \text{Equation 21}$$
$$\omega_{Rl,k} = \left[\left(T_{PRl,k-1} - T_{BRl,k-1} - T_{rRl,k-1} + F_{xRl,k-1}r\right)\frac{1}{I_\omega}\right]\Delta t + \omega_{Rl,k-1}$$

$$f_4(x_{k-1}, u_{k-1}) = x_{k,4} = \quad \text{Equation 22}$$
$$\omega_{Rr,k} = \left[\left(T_{PRr,k-1} - T_{BRr,k-1} - T_{rRr,k-1} + F_{xRr,k-1}r\right)\frac{1}{I_\omega}\right]\Delta t + \omega_{Rr,k-1}$$

$$f_5(x_{k-1}, u_{k-1}) = x_{k,5} = \dot{\varphi}_k \approx \left\{\left[F_{yF,k-1}L_F - F_{yR,k-1}L_R + \left(F_{xFl,k-1}\cos\delta_{F,k-1} - F_{xFr,k-1}\cos\delta_{F,k-1}\right)\frac{e_F}{2} + \left(F_{xRl,k-1} - F_{xRr,k-1}\right)\frac{e_R}{2}\right]\frac{1}{I_z}\right\}\Delta t + \dot{\varphi}_{k-1} \text{ where} \quad \text{Equation 23}$$

$$F_{yF} = -(F_{xFl}\sin\delta_F + F_{xFr}\sin\delta_F) + F_{yFa}\cos\delta_F \quad \text{Equation 24}$$

$$F_{yR} \approx F_{yRa} \quad \text{Equation 25}$$

$$f_6(x_{k-1}, u_{k-1}) = x_{k,6} = F_{xFl,k} = \dot{F}_{xFl,k-1}\Delta t + F_{xFl,k-1} \quad \text{Equation 26}$$

$$f_7(x_{k-1}, u_{k-1}) = x_{k,7} = \dot{F}_{xFl,k} = 0 \quad \text{Equation 27}$$

$$f_8(x_{k-1}, u_{k-1}) = x_{k,8} = F_{xFr,k} = \dot{F}_{xFr,k-1}\Delta t + F_{xFr,k-1} \quad \text{Equation 28}$$

$$f_9(x_{k-1}, u_{k-1}) = x_{k,9} = \dot{F}_{xFr,k} = 0 \quad \text{Equation 29}$$

$$f_{10}(x_{k-1}, u_{k-1}) = x_{k,10} = F_{xRl,k} = \dot{F}_{xRl,k-1}\Delta t + F_{xRl,k-1} \quad \text{Equation 30}$$

$$f_{11}(x_{k-1}, u_{k-1}) = x_{k,11} = \dot{F}_{xRl,k} = 0 \quad \text{Equation 31}$$

$$f_{12}(x_{k-1}, u_{k-1}) = x_{k,12} = F_{xRr,k} = \dot{F}_{xRr,k-1}\Delta t + F_{xRr,k-1} \quad \text{Equation 32}$$

$$f_{13}(x_{k-1}, u_{k-1}) = x_{k,13} = \dot{F}_{xRr,k} = 0 \quad \text{Equation 33}$$

$$f_{14}(x_{k-1}, u_{k-1}) = x_{k,14} = F_{yFa,k} = \dot{F}_{yFa,k-1}\Delta t + F_{yFa,k-1} \quad \text{Equation 34}$$

$$f_{15}(x_{k-1}, u_{k-1}) = x_{k,15} = \dot{F}_{yFa,k} = 0 \quad \text{Equation 35}$$

$$f_{16}(x_{k-1}, u_{k-1}) = x_{k,16} = F_{yRa,k} = \dot{F}_{yRa,k-1}\Delta t + F_{yRa,k-1} \quad \text{Equation 36}$$

$$f_{17}(x_{k-1}, u_{k-1}) = x_{k,17} = \dot{F}_{yRa,k} = 0 \quad \text{Equation 37}$$

$$\hat{y}_k = h(x_k), \text{ where} \quad \text{Equation 38}$$

$$y_k = [\dot{\varphi}, \omega_{Fl}, \omega_{Fr}, \omega_{Rl}, \omega_{Rr}, a_x, a_y]^T \text{ at step } k \quad \text{Equation 39}$$

$$h(x_k) = [h_1(x_k), h_2(x_k), \ldots, h_7(x_k)]^T, \text{ where} \quad \text{Equation 40}$$

$$h_1(x_k) = \dot{\varphi}_k \quad \text{Equation 41}$$

$$h_2(x_k) = \omega_{Fl,k} \quad \text{Equation 42}$$

$$h_3(x_k) = \omega_{Fr,k} \quad \text{Equation 43}$$

$$h_4(x_k) = \omega_{Rl,k} \quad \text{Equation 44}$$

$$h_5(x_k) = \omega_{Rr,k} \quad \text{Equation 45}$$

$$h_6(x_k) = a_x = (F_{xF,k} + F_{xR,k} - F_{wind,k})\frac{1}{m}, \text{ where} \quad \text{Equation 46}$$

$$F_{xF} = -(F_{xFl}\cos\delta_F + F_{xFr}\cos\delta_F) - F_{yFa}\sin\delta_F \quad \text{Equation 47}$$

$$F_{xR} \approx -F_{xRl} - F_{xRr} \quad \text{Equation 48}$$

$$h_7(x_k) = a_y = (F_{yF,k} + F_{yR,k})\frac{1}{m}, \text{ where} \quad \text{Equation 49}$$

$$F_{yF} = -(F_{xFl}\sin\delta_F + F_{xFr}\sin\delta_F) + F_{yFa}\cos\delta_F \quad \text{Equation 50}$$

$$F_{yR} \approx F_{yRa} \quad \text{Equation 51}$$

$$P_k^- = A_k P_{k-1} A_k^T + Q, \text{ where} \quad \text{Equation 52}$$

$$A_k = \frac{\partial f}{\partial x}(\hat{x}_{k-1}, u_{k-1}) \quad \text{Equation 53}$$

$$K_k = P_k^- H_k^T (H_k P_k^- H_k^T + R)^{-1}, \text{ where} \quad \text{Equation 54}$$

$$H_k = \frac{\partial h}{\partial x}(\hat{x}_k^-) \quad \text{Equation 55}$$

$$\hat{x}_k = \hat{x}_k^- + K_k[y_k - h(\hat{x}_k^-)] \quad \text{Equation 56}$$

$$P_k = (I - K_k H_k)P_k^- \quad \text{Equation 57}$$

It should be understood and appreciated that vector $y_k$, shown in Equations 38, 39, and 56 above, describes measurements generated by the sensors 120 in the physical system described by Equations 13 and 14 above, with the measurement noise from the electronic components 700.

In some examples, the initial value of $P_i$ is equal to Q in Equation 12, above. It should be appreciated that Q and R are parameters that can be tuned in the Extended Kalman Filter 872. Further, in some examples, Q and R in Equations 52 and 54, above, are respectively described by matrix Equations 58 and 59, below.

$$Q = \text{diag}(1e-4, 0.4, 0.4, 0.4, 0.4, 25, 2.5e5, 25, 2.5e5, 25, 2.5e5, 25, 2.5e5, 25, 2.5e5, 10, 1e5, 10, 1e5) \quad \text{Equation 58}$$

$$R = \text{diag}(0.01, 0.1, 0.1, 0.1, 0.1, 0.3, 0.02) \quad \text{Equation 59}$$

Thus, once the tire longitudinal and lateral tire force estimator 870 has executed the Extended Kalman Filter 872, the Tire Dynamics Analyzer has estimated ten tire forces: four longitudinal tire forces ($F_{xFl}$, $F_{xFr}$, $F_{xRl}$, $F_{xRr}$), two lateral per-axle tire forces ($F_{yFa}$, $F_{yRa}$), and four normal tire forces ($F_{zFl}$, $F_{zFr}$, $F_{zRl}$, $F_{zRr}$).

In operation, the feedback generator 880 generates messages related to the estimated values of the estimated tire forces. More specifically, the feedback generator 880 accesses the vehicle dynamics force threshold database 722 stored in the memory 720 to compare the estimated tire forces against the stored vehicle dynamics thresholds. If one or more of estimated tire forces exceeds one or more of the vehicle dynamics thresholds, the feedback generator 880 generates warning messages for display on the IHU 140. In some examples, the warning messages remind the driver of the vehicle 110 that improved driving habits (e.g., less aggressive acceleration, smoother turns, etc.) may extend the service life of the tires of the wheel and tire assemblies 112. In some examples, the warning messages indicate to the driver of the vehicle 110 that the tires of the wheel and tire assemblies 112 have reached the end of their recommended service life. In some examples, the warning messages indicate to the driver of the vehicle 110 that the tires of the wheel and tire assemblies 112 are under an overly large (e.g., beyond recommended) tire force. Further, if the estimated tire forces are within (e.g., do not exceed) the vehicle dynamics thresholds, the feedback generator 880 generates congratulatory messages for display on the IHU 140. In some examples, the congratulatory messages compliment a driver of the vehicle 110 on driving habits that may extend the service life of the tires of the wheel and tire assemblies 112. In some examples, the congratulatory messages compliment a driver of the vehicle 110 on driving habits that may improve fuel economy of the vehicle 110.

Figure 9:
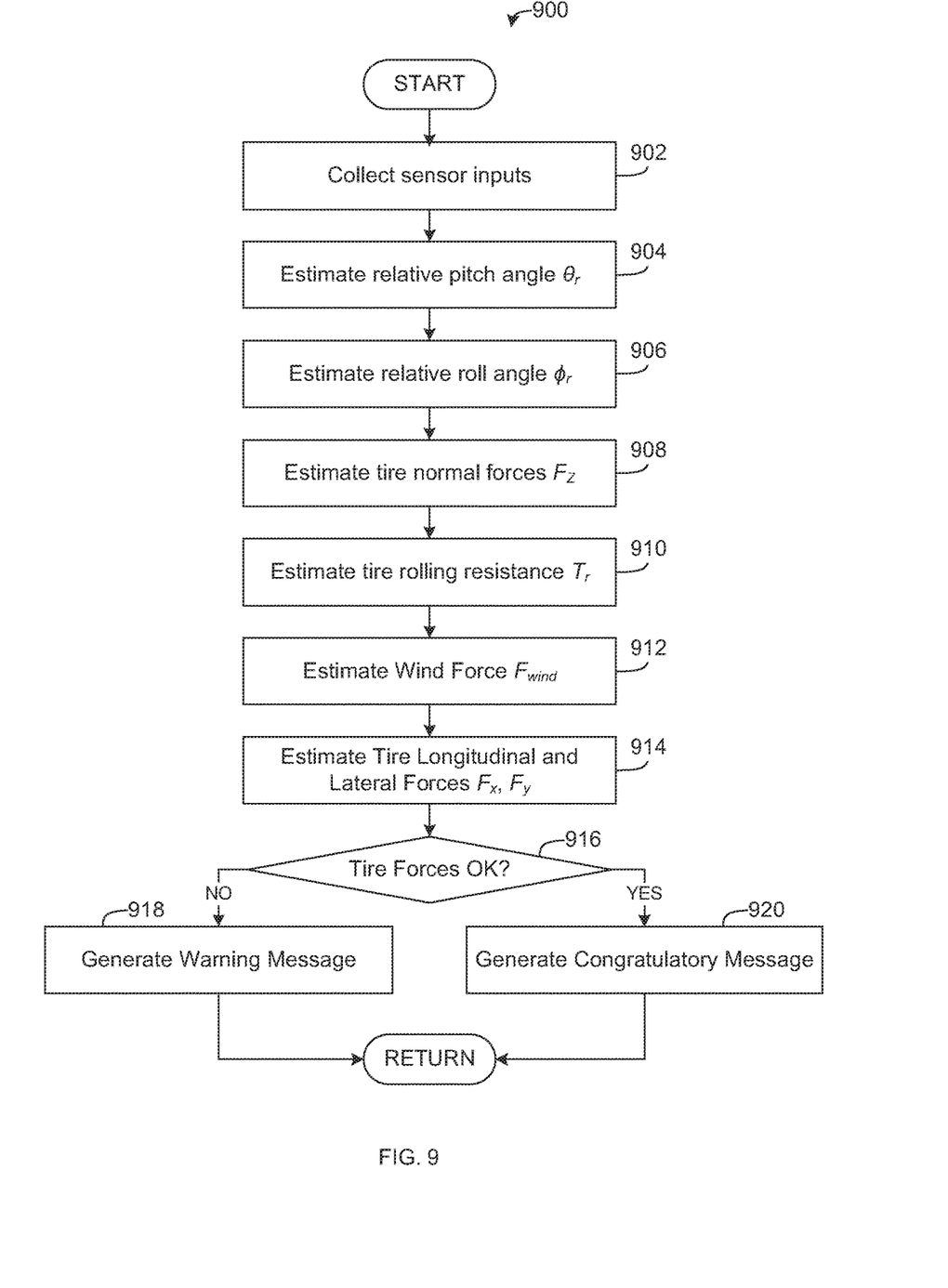
FIG. 9 is a flowchart of a method to estimate tire forces, which may be implemented by the electronic components of FIG. 3.

FIG. 9 is a flowchart of a method 900 to analyze tire dynamics, which may be implemented by the electronic components 700 of FIG. 7. The flowchart of FIG. 9 is representative of machine readable instructions stored in memory (such as the memory 720 of FIG. 7) that comprise one or more programs that, when executed by a processor (such as the processor 710 of FIG. 7), cause the vehicle 110 to implement the example Tire Dynamics Analyzer 730 of FIGS. 7 and 8. Further, although the example program(s) is/are described with reference to the flowchart illustrated in FIG. 9, many other methods of implementing the example Tire Dynamics Analyzer 730 may alternatively be used. For example, the order of execution of the blocks may be changed, and/or some of the blocks described may be changed, eliminated, or combined.

Initially, at block 902, the data receiver 810 collects inputs from the sensors 120.

At block 904, the relative angle estimator 820 estimates the relative pitch angle $\theta_r$ and the relative roll angle $\theta_r$ based on the sensor inputs and the first, second, third and fourth constants $c_1$, $c_2$, $c_3$, $c_4$.

At block 906, the effective mass estimator 830 estimates the front and rear effective masses $m_F$, $m_R$ based on the relative pitch angle $\theta_r$, the geometry of the vehicle 110, the sensor inputs, and the mass m of the vehicle 110.

At block 908, the tire normal force estimator 840 estimates the tire normal forces $F_z$ for each of the wheel and tire assemblies 112 based on the relative roll angle $\phi_r$, the geometry of the vehicle 110, the sensor inputs, and the front and rear effective masses $m_F$, $m_R$.

At block 910, rolling resistance estimator 850 estimates the tire rolling resistances $T_r$ for each of the wheel and tire assemblies 112 based on the tire normal forces $F_z$, the sensor inputs, and the fifth and sixth constants $c_5$, $c_6$.

At block 912, the wind force estimator 860 estimates the wind force $F_{wind}$ based on the sensor inputs and the seventh constant $c_7$.

At block 914, the tire longitudinal and lateral force estimator 870 executes the extended Kalman filter 872 to estimate the tire longitudinal and lateral forces $F_x$, $F_y$ based on the sensor inputs and the tire rolling resistances $T_r$.

At block 916, the feedback generator 880 determines whether the tire forces $F_x$, $F_y$, $F_z$ are within the vehicle dynamics thresholds stored in the memory 720.

If, at block 916, the feedback generator 880 determines that the tire forces $F_x$, $F_y$, $F_z$ are not within the vehicle dynamics thresholds, the method 900 proceeds to block 918

At block 918, the feedback generator 880 generates a warning message to be displayed on the IHU 140. The method 900 then returns to block 902.

If, at block 916, the feedback generator 880 determines that the tire forces $F_x$, $F_y$, $F_z$ are within the vehicle dynamics thresholds, the method 900 proceeds to block 920.

At block 920, the feedback generator 880 generates a congratulatory message to be displayed on the IHU 140. The method 900 then returns to block 902.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may more accurately estimate forces exerted on vehicle tires in real time and in all driving conditions. Further displaying messages related to long-term tire wear and/or driving habit improvements may aid drivers in operating vehicles, and/or reduce vehicle maintenance costs. Additionally, more accurately estimating tire forces may improve vehicle dynamics control performance. It should also be appreciated that the disclosed apparatus and methods provide a specific solution—estimating tire forces based on relative pitch and roll angles and tire rolling resistances—to a specific problem—inaccurate tire force estimation in real time across all types of vehicle running states. Further, the disclosed apparatus and methods provide an improvement to computer-related technology by increasing functionality of a processor to estimate relative pitch and roll angles, estimate vehicle front and rear effective masses, estimate tire normal forces, estimate tire rolling resistances, estimate vehicle wind force, estimate tire longitudinal and lateral forces, and generate messages based on estimated tire forces.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    sensors to generate vehicle dynamics information (VDI);
    a processor and memory in communication with the sensors and configured to:
    estimate relative pitch and roll angles using the VDI;
    estimate a normal tire force using the relative pitch and roll angles;
    estimate a tire rolling resistance using the normal tire force; and
    estimate longitudinal and lateral tire forces using the rolling resistance;
    generate a warning when one or more of the tire forces exceeds a vehicle dynamics threshold; and
    a display in communication with the processor and configured to display the warning.

2. The vehicle of claim 1, wherein:
the processor is further configured to estimate front and rear effective masses; and
the processor is further configured to estimate the normal tire force using the front and rear effective masses.

3. The vehicle of claim 1, wherein the processor is configured to estimate the relative pitch and roll angles using a plurality of predetermined constants.

4. The vehicle of claim 3, wherein the plurality of predetermined constants are related to one or more of vehicle geometry, a spring constant, a damping rate, or suspension linkage joint friction.

5. The vehicle of claim 1, wherein the processor is configured to estimate the tire rolling resistance using a plurality of predetermined constants.

6. The vehicle of claim 5, wherein the plurality of predetermined constants are related to one or more of tire geometry or tire material composition.

7. The vehicle of claim 1, wherein
the processor is further configured to estimate a wind resistance force using the vehicle dynamics information; and
the longitudinal and lateral tire forces are based on the wind resistance force.

8. The vehicle of claim 1, wherein the warning indicates that one or more tires of the vehicle are worn.

9. A method comprising:
estimating, with a processor, relative vehicle angles using vehicle dynamics information from sensors;
estimating, with the processor, a normal tire force using the relative vehicle angles;
estimating, with the processor, a rolling resistance using the normal tire force;
estimating, with the processor, longitudinal and lateral tire forces using the rolling resistance; and
displaying, with a display, a warning if one or more of the tire forces exceeds a vehicle dynamics threshold.

10. The method of claim 9, further comprising estimating, with the processor, front and rear effective masses, wherein estimating the normal tire force is performed using the front and rear effective masses.

11. The method of claim 9, wherein estimating the relative vehicle angles is performed using a plurality of predetermined constants.

12. The method of claim 11, wherein the plurality of predetermined constants are related to one or more of vehicle geometry, a spring constant, a damping rate, or suspension linkage joint friction.

13. The method of claim 9, wherein estimating the rolling resistance is performed using a plurality of predetermined constants related to one or more of tire geometry or tire material composition.

14. The method of claim 9, further comprising estimating, with the processor, a wind resistance force using the vehicle dynamics information, wherein the longitudinal and lateral tire forces are based on the wind resistance force.

15. The method of claim 9, wherein the warning indicates a worn vehicle tire.

16. A system comprising:
an inertial measurement unit (IMU) disposed in a vehicle;
a processor in communication with the IMU and configured to:
receive vehicle dynamics information (VDI) from the IMU;
estimate a relative pitch angle and a relative roll angle based on the VDI;
estimate front and rear effective masses based on the relative pitch angle;
estimate a tire normal force based on the relative roll angle and the front and rear effective masses;
estimate a tire rolling resistance based on the tire normal force and the VDI; and
estimate a tire longitudinal force and a tire lateral force based on the tire rolling resistance and the VDI; and
a memory in communication with the processor to store a vehicle dynamics threshold; and
a display in communication with the processor;
wherein, if one or more of the normal, longitudinal, or lateral tire forces exceeds the vehicle dynamics threshold, the processor is further configured display a warning message via the display.

17. The system of claim 16, wherein:
the processor is further configured to estimate a wind resistance force; and
the tire longitudinal force and the tire lateral force are further based on the wind resistance force.

18. The system of claim 16, wherein, the relative pitch angle and the relative roll angle are further based on a plurality of predetermined constants.

19. The system of claim 16, wherein the relative pitch angle, the relative roll angle, and the tire rolling resistance are further based on a plurality of predetermined constants.

20. The system of claim 16, wherein the warning indicates a worn tire of the vehicle.

* * * * *